US009963972B2

(12) United States Patent
Suciu et al.

(10) Patent No.: US 9,963,972 B2
(45) Date of Patent: May 8, 2018

(54) MIXING PLENUM FOR SPOKED ROTORS (71) Applicant: United Technologies Corporation, Hartford, CT (US)

(72) Inventors: Gabriel L. Suciu, Glastonbury, CT (US); Brian D. Merry, Andover, CT (US); James D. Hill, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 462 days.

(21) Appl. No.: 14/797,923

(22) Filed: Jul. 13, 2015

(65) Prior Publication Data
US 2016/0186571 A1 Jun. 30, 2016

Related U.S. Application Data (60) Provisional application No. 62/036,464, filed on Aug. 12, 2014.

(51) Int. Cl.
F01D 5/08 (2006.01)
F01D 11/00 (2006.01)
(Continued)

(52) U.S. Cl.
CPC .............. F01D 5/087 (2013.01); F01D 5/06 (2013.01); F01D 5/081 (2013.01); F01D 5/12 (2013.01);
(Continued)

(58) Field of Classification Search
CPC .......... F01D 5/081; F01D 5/082; F01D 5/084; F01D 5/085; F01D 5/087; F01D 5/06;
(Continued)

(56) References Cited

U.S. PATENT DOCUMENTS

2013/0108413 A1* 5/2013 Suciu .................... F01D 11/006
415/115
2013/0108445 A1* 5/2013 Suciu ...................... F01D 5/026
416/95
(Continued)

FOREIGN PATENT DOCUMENTS

EP 2980355 2/2016
EP 2980356 2/2016
EP 2980358 2/2016

OTHER PUBLICATIONS

Extended European Search Report dated Dec. 10, 2015 in European Application No. 15180516.5.
(Continued)

Primary Examiner — Kenneth Bomberg
Assistant Examiner — Hoon Choi
(74) Attorney, Agent, or Firm — Snell & Wilmer L.L.P.

(57) ABSTRACT

A gas turbine engine may comprise a first rotor with a primary flowpath along an outer diameter of the first rotor. A secondary flowpath may be radially inward from the primary flowpath. The secondary flowpath may pass through an opening through the first rotor. A blade may be disposed on a distal end of the first rotor. The blade may extend into the primary flowpath. A bleed tube may be in a wall of the primary flowpath and forward of the blade. The bleed tube may extend radially inward from the primary flowpath. The bleed tube may fluidly connect to the opening through the first rotor. A plenum may be aft of the blade and radially inward from the primary flowpath. The plenum may be fluidly connected to the opening through the first rotor. A second rotor may be aft of the plenum.

17 Claims, 8 Drawing Sheets (51) Int. Cl.
  *F01D 25/12*  (2006.01)
  *F01D 5/06*   (2006.01)
  *F01D 5/12*   (2006.01)
  *F01D 5/34*   (2006.01)
  *F01D 25/00*  (2006.01)
  *F04D 29/32*  (2006.01)
  *F04D 29/58*  (2006.01)

(52) U.S. Cl.
  CPC .............. *F01D 5/34* (2013.01); *F01D 11/006* (2013.01); *F01D 25/005* (2013.01); *F01D 25/12* (2013.01); *F04D 29/321* (2013.01); *F04D 29/58* (2013.01); *F05D 2220/32* (2013.01); *F05D 2220/3219* (2013.01); *F05D 2240/30* (2013.01); *F05D 2260/20* (2013.01); *F05D 2300/175* (2013.01); *Y02T 50/672* (2013.01); *Y02T 50/676* (2013.01)

(58) Field of Classification Search
  CPC . F01D 5/12; F01D 5/30; F01D 11/006; F01D 25/12; F04D 29/58
  See application file for complete search history.

(56) References Cited

U.S. PATENT DOCUMENTS

| 2013/0108466 | A1* | 5/2013 | Suciu | ...................... F01D 5/027 416/96 R |
| 2013/0108468 | A1* | 5/2013 | Suciu | ...................... F01D 5/066 416/97 R |
| 2013/0323010 | A1 | 12/2013 | Mosley et al. | |

OTHER PUBLICATIONS

European Office Action dated Mar. 9, 2017 in European Application No. 15180516.5.

* cited by examiner

MIXING PLENUM FOR SPOKED ROTORS

CROSS-REFERENCE TO RELATED APPLICATIONS

This application is a nonprovisional of, and claims priority to, and the benefit of U.S. Provisional Application No. 62/036,464, entitled "MIXING PLENUM FOR SPOKED ROTORS," filed on Aug. 12, 2014, which is hereby incorporated by reference in its entirety.

FIELD OF INVENTION

The present disclosure relates to spoked rotors, and, more specifically, to flow paths for cooling rotors in gas turbine engines.

BACKGROUND OF THE INVENTION

As higher pressures are achieved in compressors of gas turbine engines, the temperature of compressed air leaving the compressors may increase as well. As a result, the temperature differential in rotor disks of a compressor or turbine may cause thermal stress. For example, temperatures at the distal end of blades mounted to a rotor disk of a high-pressure compressor may reach 1,500° F. (815° C.) as a gas turbine engine accelerates. Meanwhile, the proximal portion of the rotor disk upon which the blade is mounted may only be at 400° F. (205° C.). The resulting temperature gradient in the rotor disk may decrease its longevity.

SUMMARY OF THE INVENTION

In various embodiments, an assembly for a gas turbine engine may comprise a first rotor defining a first opening. A second rotor may define a second opening. A mixing plenum structure may extend between the first and second rotors. The rotors and mixing plenum structure may define a mixing plenum in fluid communication with the first and second openings. The mixing plenum structure may include an outer wall coupled to a blade.

In various embodiments, the mixing plenum structure may include an inner wall opposite the outer wall and facing the outer wall. The inner wall may be configured to couple to the first and second rotors. A sealing feature may extend radially inward from the outer wall. The mixing plenum structure may comprise an austenitic nickel-chromium-based alloy. A first structure may define a bleed tube. The first structure may be formed continuously with the first rotor. The mixing plenum may comprise an annular chamber.

A compressor may comprise a first rotor defining a first opening. A first structure may define a bleed tube fluidly coupled with the first opening. The bleed tube may extend radially outward and forward of the first opening. A second rotor may define a second opening fluidly coupled to the first opening and bleed tube. A second structure may partially define a mixing plenum aft of the first opening, forward of the second opening, and in fluid communication with the first and second openings.

In various embodiments, the mixing plenum may comprise an annular chamber. The compressor may comprise a blade at a distal end of the first rotor. An outer wall of one of the first and second structures may be formed continuously with the blade. A sealing feature may extend radially inward from the outer wall. The second structure may comprise an austenitic nickel-chromium-based alloy. The second structure may comprise an inner wall formed continuously with the second rotor. The first structure defining the bleed tube may be formed continuously with the first rotor.

A cooling system may comprise a first rotor including a first opening. A second rotor may be aft of the first rotor. The second rotor may comprise a second opening fluidly coupled with the first opening. The first and second rotors may at least partially define a mixing plenum in fluid communication with the first and second openings. The mixing plenum may be configured to receive air at the first opening and guide the air to the second opening with a more uniform temperature and pressure at the second opening.

In various embodiments, the mixing plenum may comprise an annular chamber. The cooling system may further comprise a blade at a distal end of the first spoked rotor. A sealing feature may be configured to guide air from the mixing plenum into the second opening. A first structure defining a bleed tube forward of the first rotor, the first structure formed continuously with the first rotor. The plenum is further defined by a wall radially inward from the mixing plenum and formed continuously with the second rotor.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice various embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" or "fore" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
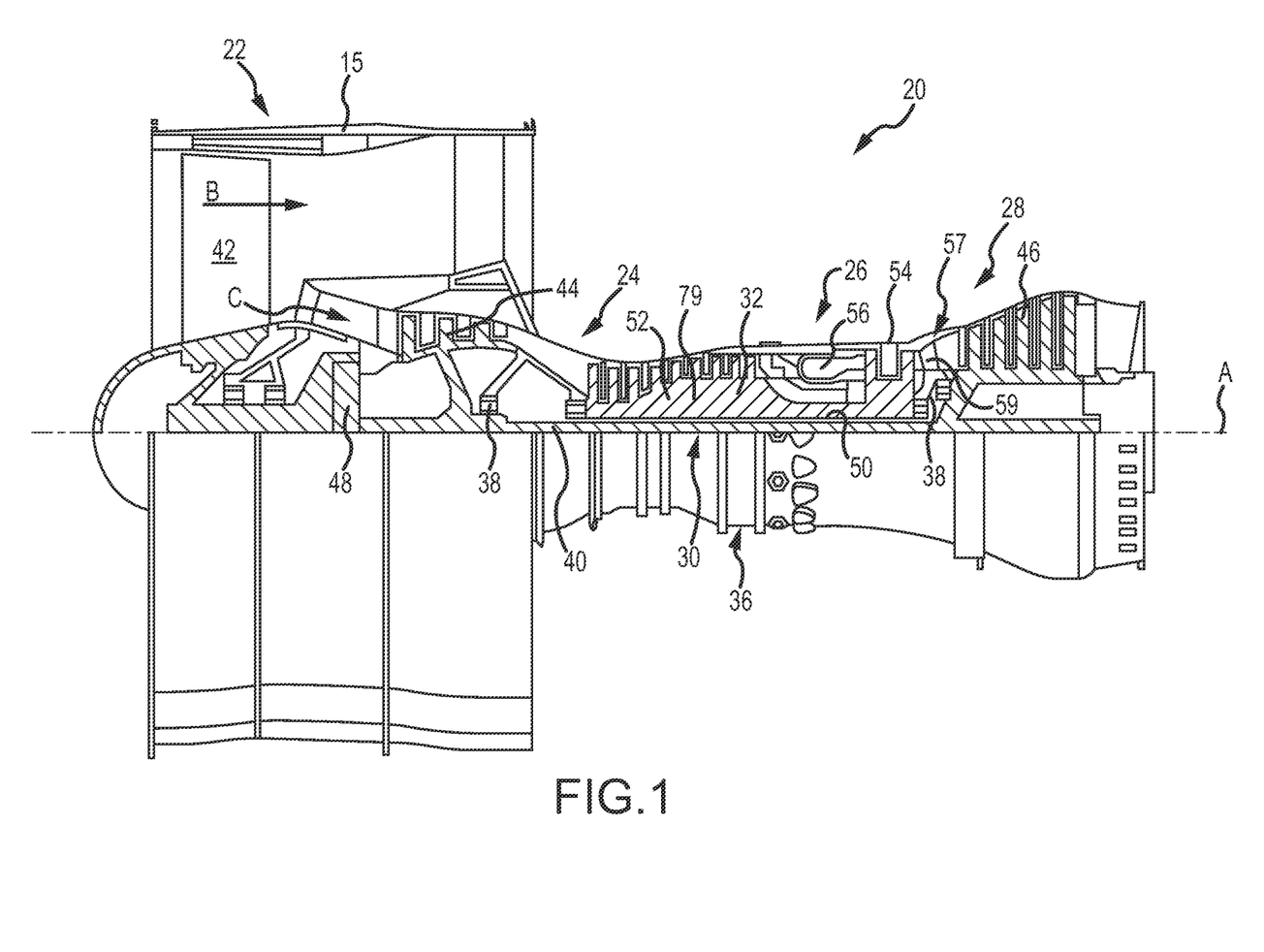
FIG. 1 illustrates a cross-sectional view of a first exemplary gas turbine engine, in accordance with various embodiments.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a primary flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7°R)]0.5. The "Low corrected fan tip speed" as disclosed herein according to one non-limiting embodiment is less than about 1150 ft/second (350.5 meters/second).

Figure 2:
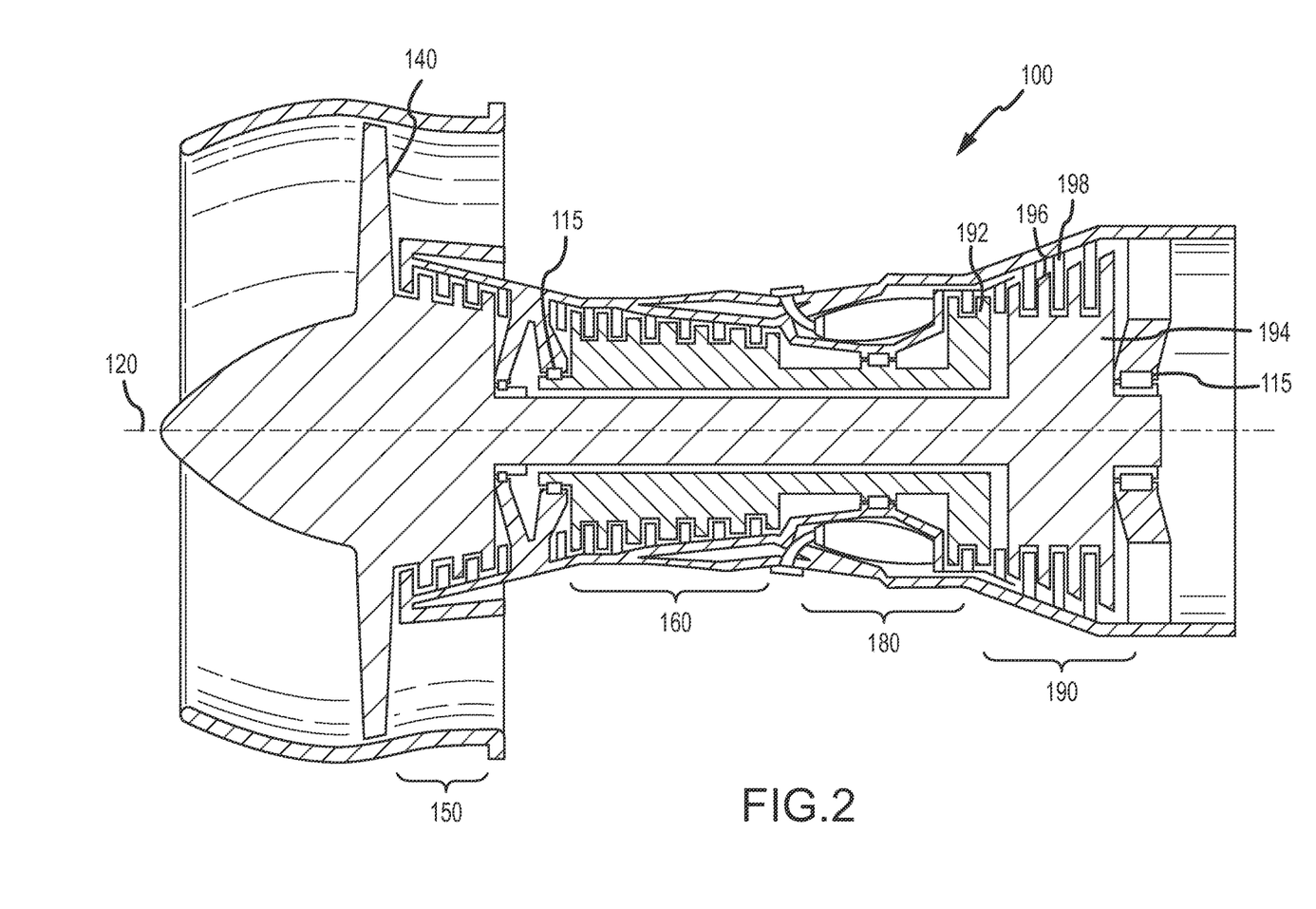
FIG. 2 illustrates a cross-sectional view of a second exemplary gas turbine engine, in accordance with various embodiments.

Referring to FIG. 2, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and a turbine section 190. Air compressed in compressor sections 150, 160 may be mixed with fuel and burned in combustion section 180 and expanded across turbine section 190. Turbine section 190 may include high-pressure rotors 192 and low-pressure rotors 194, which rotate in response to the expansion. Turbine section 190 may comprise alternating rows of rotary airfoils or blades 196 and static airfoils or vanes 198. A plurality of bearings 115 may support spools in the gas turbine engine 100. FIGS. 1 and 2 provide a general understanding of the sections in a gas turbine engine, and are not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 3:
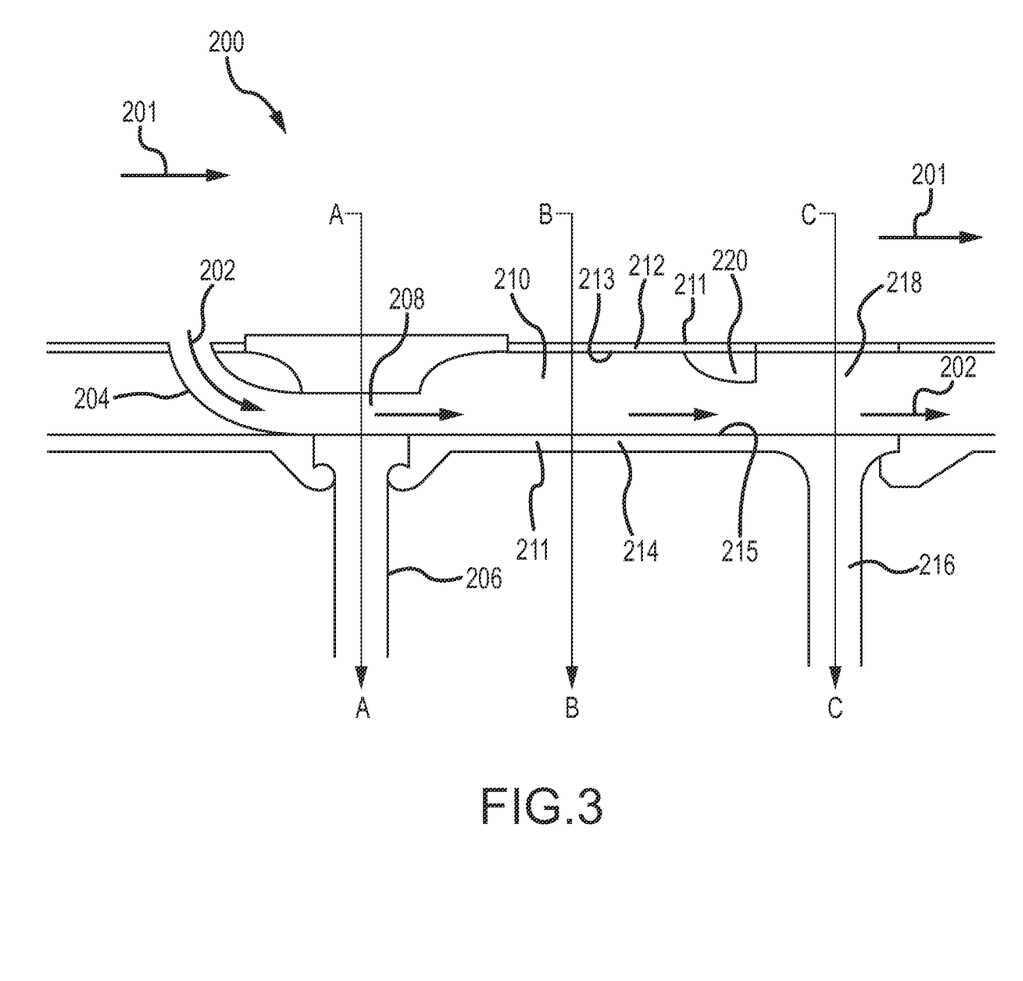
FIG. 3 illustrates a flow path passing through spoked rotors and in communication with a mixing plenum, in accordance with various embodiments.

FIG. 3 illustrates a flow path through spoked rotors and a mixing plenum, in accordance with various embodiments. Compressor 200 defines a primary flow path 201 (similar to primary flowpath C in FIG. 1) along a distal end of rotor 206, a radially outer surface of wall 212, and a distal end of rotor 216. Bleed tube 204 has one opening adjacent primary flowpath 201 and connects to an opening 208 through rotor 206 at the aft end of bleed tube 204. Rotor 206 may be a spoked rotor comprising a plurality of openings 208 of uniform size and equally circumferentially spaced around a distal region of rotor 206.

In various embodiments, gas flowing in secondary flowpath 202 flows through bleed tube 204, through opening 208 in rotor 206, and into mixing plenum 210. A secondary flowpath 202 may not produce thrust but may be in fluid communication with primary flow path 201 via bleed tube 204. Mixing plenum 210 may be defined in part by a fore portion of rotor 216, an aft portion of rotor 206, sealing features 220, and mixing plenum structure 211. Mixing plenum structure 211 may be defined by surface 213 of wall 212 that is continuous with rotor 206. Mixing plenum 210 may have a radial length greater than the radial length of opening 208 through rotor 206. Mixing plenum 210 may also be defined by surface 215 of wall 214 radially inward from wall 212 and formed as a continuous piece with rotor 216.

Secondary flowpath 202 is defined in fluid communication with mixing plenum 210, where a secondary flow passing through openings 208 in rotor 206 may mix to normalize pressure and temperature of the gas within mixing plenum 210. In this manner, mixing plenum 210 may reduce hot spots in rotors 206 and 216 and provide uniform cooling by normalizing the pressure and temperature of gas at the mixing plenum prior to the gas reaching openings 218 and cooling rotor 216. Mixing plenum 210 also fluidly couples a portion of the flowpath passing through opening 208 in rotor 206 and with openings 218 in rotor 216 to provide improved cooling for the disks and reduce the temperature gradient between the distal ends of rotors 206 and 216 and proximal portions of rotors 206 and 216.

In various embodiments, gas in secondary flowpath 202 may pass through mixing plenum 210 and into opening 218 of rotor 216. Opening 218 of rotor 216 may have a different size or shape than opening 208 of rotor 206. Thus, openings 218 of rotor 216 may not align perfectly with openings 208 of rotor 206. Mixing plenum 210 provides a normalized, uniform temperature and pressure gas in secondary flowpath 202 to pass through openings 218 of rotor 216. Sealing features 220 may also extend from rotor 216 and be shaped or configured to direct secondary flowpath 202 into openings 218 of rotor 216.

In various embodiments, rotors 206 and 216, bleed tube 204, and mixing plenum structure 211 may be formed from any suitable material capable of sustaining high thermal loads present in a compressor. In this regard, rotors 206 and 216, bleed tube 204, and mixing plenum structure 211 may be a high performance alloy (e.g., an austenitic nickel-chromium-based alloy such as INCONEL), a high temperature composite, and/or the like. Rotors 206 and 216, bleed tube 204, and mixing plenum 210 may be made using metal working processes such as casting, fabrication, and/or additive manufacturing processes.

Figure 4A:
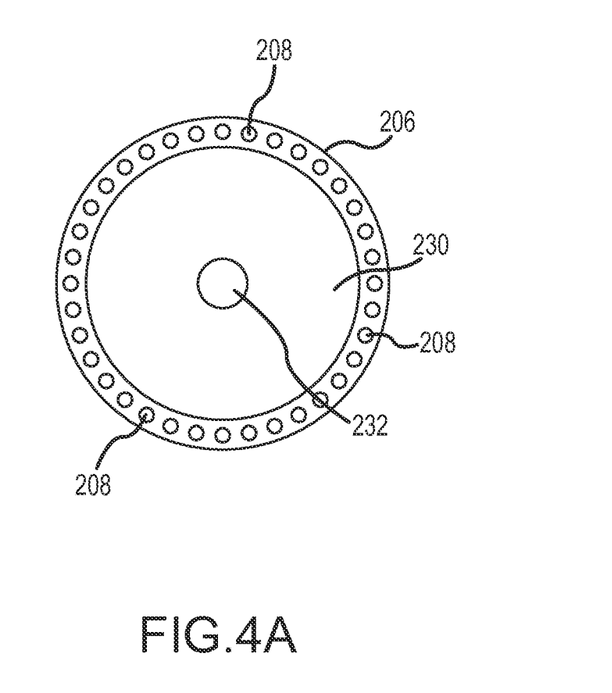
FIG. 4A illustrates a cross section of a first exemplary spoked rotor, in accordance with various embodiments.

FIG. 4A illustrates a cross section of exemplary rotor 206 taken along line A, in accordance with various embodiments. Rotor 206 may be a spoked rotor. Openings 208 in rotor 206 may be round, polygonal, or irregularly shaped and extend axially through rotor 206. Openings 208 may be evenly spaced (e.g., evenly circumferentially spaced) or spaced at irregular intervals around a distal region of rotor 206. Rotor 206 may comprise a solid proximal portion 230 with central opening 232.

Figure 4B:
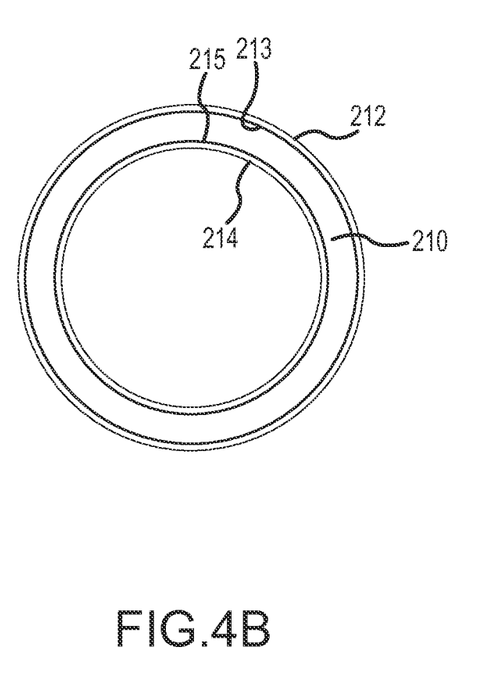
FIG. 4B illustrates a cross section of a mixing plenum structure, in accordance with various embodiments.

FIG. 4B illustrates a cross section of mixing plenum structure 211 defining mixing plenum 210 taken along line B, in accordance with various embodiments. Mixing plenum structure 211 may be defined by surface 213 of wall 212 and surface 215 of wall 214. Wall 214 and wall 212 may be continuously formed with rotor 206 or rotor 216.

Figure 4C:
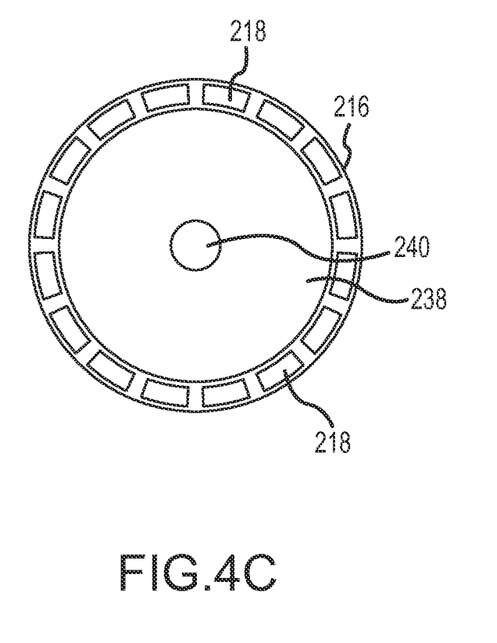
FIG. 4C illustrates a cross section of a second exemplary spoked rotor, in accordance with various embodiments.

FIG. 4C illustrates a cross section of rotor 216 taken along line C, in accordance with various embodiments. Rotor 216 may be a spoked rotor and may define openings 218. Openings 218 in rotor 216 may be round, polygonal, or irregularly shaped and extend axially through rotor 206. Openings 218 may be evenly spaced or spaced at irregular intervals around a distal region of rotor 216. Rotor 216 may comprise a solid proximal portion 238 with central opening 240. Openings 218 of rotor 216 may be a different size or shape than openings 208 of rotor 206, as shown in FIG. 3A. Thus, respective centerlines of openings 218 of rotor 216 and of openings 208 of rotor 206 may not align with one another. It will be appreciated that mixing plenum 210 helps provide air flow passing therethrough with uniform pressure and temperature as it flows into openings 218 of rotor 216, regardless of alignment of openings 218 and 208.

Figure 5:
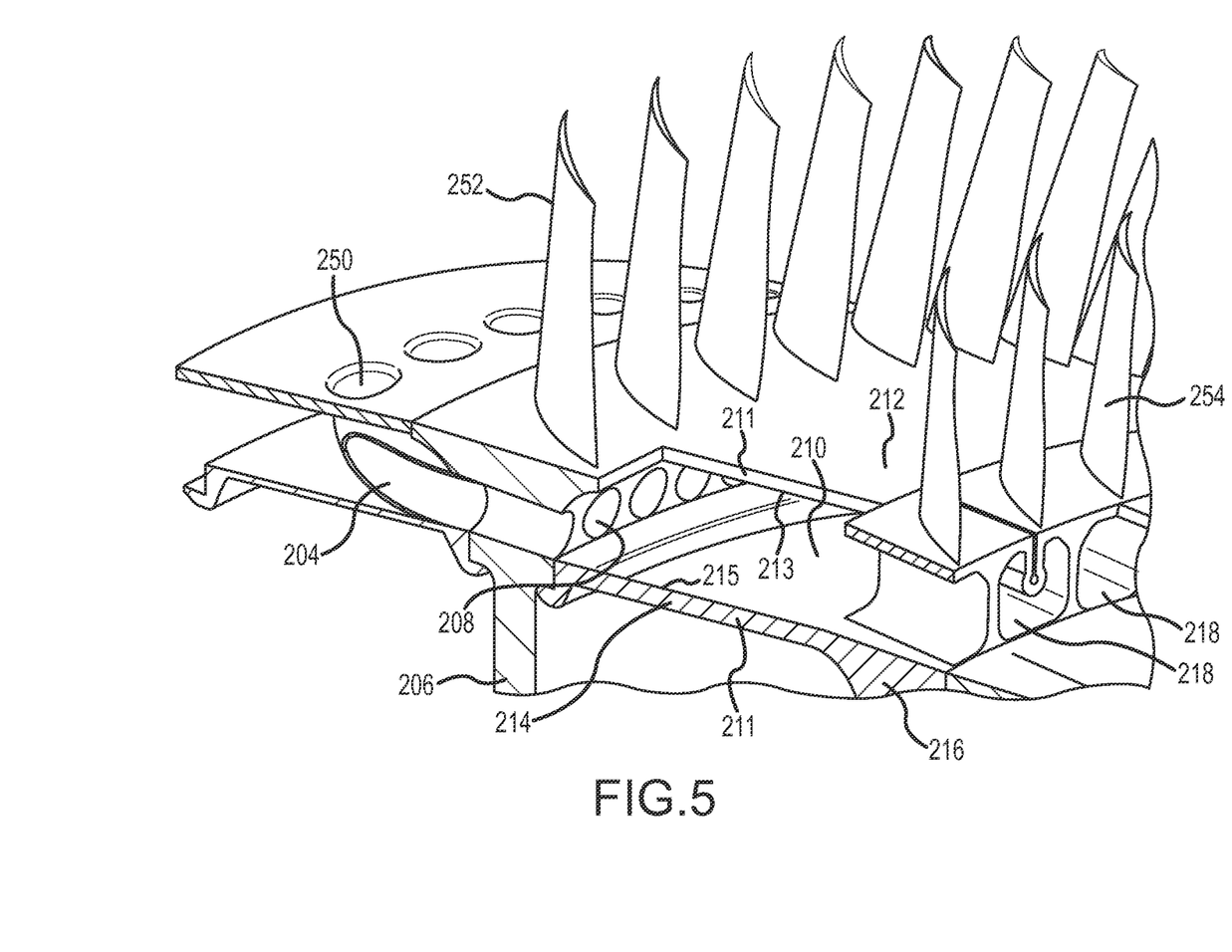
FIG. 5 illustrates a three-dimensional cutaway of a compressor with a mixing plenum defined between spoked rotors, in accordance with various embodiments.

FIG. 5 illustrates a three-dimensional cutaway of a compressor with a mixing plenum between spoked rotors, in accordance with various embodiments. For example, compressor may be a high pressure compressor or low pressure compressor (e.g., high pressure compressor 52 and low pressure compressor 44 from FIG. 1). Openings 250 of bleed tubes 204 are forward of blades 252 at a distal end of rotor 206. Openings 250 allow primary flow to split off into bleed tubes 204 and move through secondary flowpath 202 (as shown in FIG. 3). Bleed tubes 204 may have a one-to-one relationship with openings 208 in rotor 206 so that each opening 250 of bleed tube 204 leads into an opening 208. Similarly, each opening 208 may connect to a bleed tube 204 with opening 250. Mixing plenum 210 may have an annular shape and may be continuous around a circumference of the mixing plenum. Surface 213 of wall 212 defining the boundary of mixing plenum 210 may be continuous with blades 252 forward of mixing plenum 210. Wall 214 defining a boundary of mixing plenum 210 may be continuous with rotor 216 aft of mixing plenum 210. Rotor 216 further includes blades 254 at a distal end of the rotors. Openings 218 through rotor 216 may be symmetric or may have different shapes and sizes.

Figure 6:
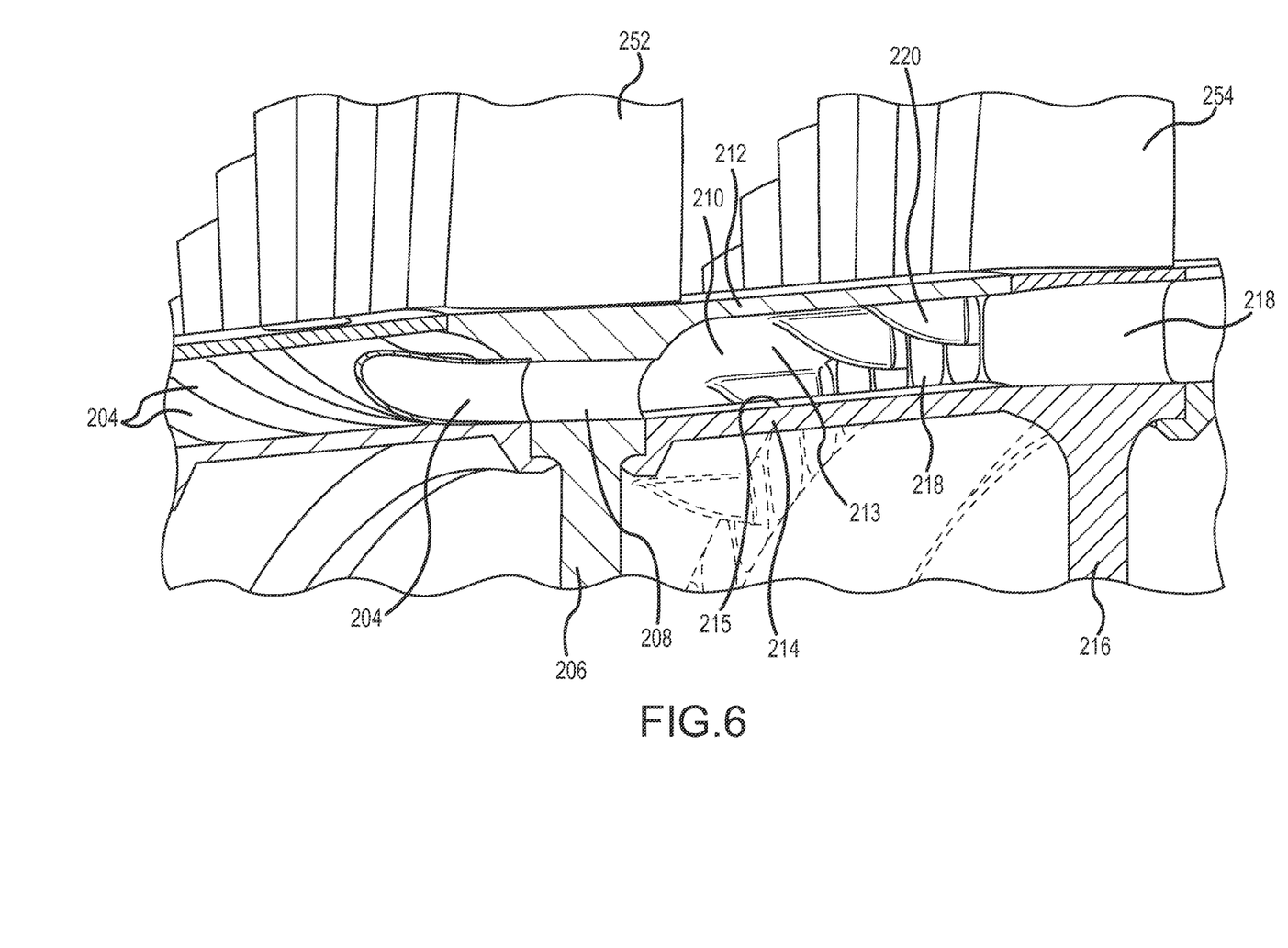
FIG. 6 illustrates a three-dimensional cutaway of a compressor with a mixing plenum defined between spoked rotors, in accordance with various embodiments.

FIG. 6 illustrates a three-dimensional cutaway of compressor 200 with a mixing plenum 210 defined between rotors 206, 216. Mixing plenum 210 may include sealing features 220. Sealing features 220 guide air flow into openings 218 of rotor 216. Sealing features may be disposed between each opening 218, between every other opening 218, or at any suitable frequency around a circumference of mixing plenum 210. Bleed tubes 204 may be formed continuously with rotor 206 (i.e., from the same piece of metal) or may be formed separately from rotor 206. Mixing plenum 210 and bleed tubes 204 may rotate with rotors 206 and 216 during operation of compressor 200.

Various benefits, advantages, and structural configurations have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An assembly for a gas turbine engine, comprising:
   a first rotor having a first plurality of fluid passageways;
   a second rotor having a second plurality of fluid passageways; and
   a mixing plenum structure extending between and coupled to the first rotor and the second rotor and configured to provide fluid communication between the first plurality of passageways and the second plurality of passageways,
   wherein the mixing plenum structure is hollow and has an outer boundary, the outer boundary comprising
   an aft facing wall of the first rotor, the aft facing wall including a first plurality of openings corresponding with the first plurality of passageways,
   a fore facing wall of the second rotor, the fore facing wall including a second plurality of openings corresponding with the second plurality of passageways,
   a smooth cylindrical radially outer surface having a circular cross section extending between the aft facing wall and the fore facing wall, the smooth cylindrical radially outer surface disposed radially outward of the first plurality of openings and the second plurality of openings and
   a smooth cylindrical radially inner surface having a circular cross section extending between the aft facing wall and the fore facing wall, the smooth cylindrical radially inner surface disposed radially inward of the first plurality of openings and the second plurality of openings.

2. The assembly of claim 1, wherein the mixing plenum structure includes an outer wall configured to couple to a blade.

3. The assembly of claim 2, wherein the mixing plenum structure includes an inner wall opposite and facing the outer wall and configured to couple to the first rotor and the second rotor.

4. The assembly of claim 2, wherein the mixing plenum structure comprises an austenitic nickel-chromium-based alloy.

5. The assembly of claim 1, further including a first structure defining a bleed tube, wherein the first structure is formed continuously with the first rotor.

6. The gas turbine engine of claim 1, wherein the mixing plenum comprises an annular chamber.

7. A compressor, comprising:
   a first rotor defining a first opening therethrough;
   a first structure defining a bleed tube fluidly coupled with and extending radially outward and forward of the first opening;
   a second rotor defining a second opening therethrough fluidly coupled to the first opening and the bleed tube; and a second structure at least partially defining a mixing plenum, aft of the first opening and forward of the second opening and providing fluid communication between the first opening and the second opening,
wherein the mixing plenum is hollow and has an outer boundary, the outer boundary comprising
an aft facing wall of the first rotor, the aft facing wall including a first aperture corresponding with the first opening therethrough,
a fore facing wall of the second rotor, the fore facing wall including a second aperture corresponding with the second opening therethrough,
a smooth cylindrical radially outer surface having a circular cross section extending between the aft facing wall and the fore facing wall, the smooth cylindrical radially outer surface disposed radially outward of the first aperture and the first opening therethrough and the second aperture and the second opening therethrough and
a smooth cylindrical radially inner surface having a circular cross section extending between the aft facing wall and the fore facing wall, the smooth cylindrical radially inner surface disposed radially inward of the first aperture and the first opening therethrough and the second aperture and the second opening therethrough.

8. The compressor of claim 7, wherein the mixing plenum comprises an annular chamber.

9. The compressor of claim 7, further comprising a blade at a distal end of the first rotor, wherein an outer wall of one of the first structure and the second structure is formed continuously with the blade.

10. The compressor of claim 9, wherein the second structure comprises an austenitic nickel-chromium-based alloy.

11. The compressor of claim 7, wherein the second structure comprises an inner wall formed continuously with the second rotor.

12. The compressor of claim 7, wherein the first structure defining the bleed tube is formed continuously with the first rotor.

13. A cooling system, comprising:
a first rotor comprising a first opening extending therethrough;
a second rotor aft of the first rotor and comprising a second opening extending therethrough fluidly coupled with the first opening,
wherein the first rotor and the second rotor at least partially define a mixing plenum therebetween providing fluid communication between the first opening and the second opening,
wherein the mixing plenum is hollow and has an outer boundary, the outer boundary comprising
an aft facing wall of the first rotor, the aft facing wall including a first aperture corresponding with the first opening,
a fore facing wall of the second rotor, the fore facing wall including a second aperture corresponding with the second opening,
a smooth cylindrical radially outer surface having a circular cross section extending between the aft facing wall and the fore facing wall, the smooth cylindrical radially outer surface disposed radially outward of the first aperture and the first opening and the second aperture and the second opening and
a smooth cylindrical radially inner surface having a circular cross section extending between the aft facing wall and the fore facing wall, the smooth cylindrical radially inner surface disposed radially inward of the first aperture and the first opening and the second aperture and the second opening.

14. The cooling system of claim 13, wherein the mixing plenum comprises an annular chamber.

15. The cooling system of claim 13, further comprising a blade at a distal end of the first rotor.

16. The cooling system of claim 13, further including a first structure defining a bleed tube forward of the first rotor, the first structure formed continuously with the first rotor.

17. The cooling system of claim 13, wherein the mixing plenum is further defined by a wall radially inward from the mixing plenum and formed continuously with the second rotor.

* * * * *